(12) United States Patent
Kobayashi

(10) Patent No.: US 8,036,121 B2
(45) Date of Patent: Oct. 11, 2011

(54) METHOD OF ESTIMATING QUALITY DEGRADATION ON NETWORK IN COMMUNICATION NETWORK SYSTEM

(75) Inventor: Masayoshi Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 12/438,243

(22) PCT Filed: Aug. 8, 2007

(86) PCT No.: PCT/JP2007/065519
§ 371 (c)(1),
(2), (4) Date: Feb. 20, 2009

(87) PCT Pub. No.: WO2008/023570
PCT Pub. Date: Feb. 28, 2008

(65) Prior Publication Data
US 2010/0177646 A1    Jul. 15, 2010

(30) Foreign Application Priority Data

Aug. 22, 2006  (JP) .................................. 2006-225181

(51) Int. Cl.
*H04J 1/16* (2006.01)

(52) U.S. Cl. ......................... 370/232; 370/252; 370/242

(58) Field of Classification Search .................. 370/252, 370/242, 244, 253, 254, 255, 235, 236, 237
See application file for complete search history.

(56) References Cited

U.S. PATENT DOCUMENTS

| 5,815,668 A | 9/1998 | Hashimoto |
| 7,606,896 B2 | 10/2009 | Kobayashi |
| 2007/0211645 A1* | 9/2007 | Tachibana et al. ............ 370/252 |

FOREIGN PATENT DOCUMENTS

| JP | 2000-224172 | 8/2000 |
| JP | 2002-64493 | 2/2002 |
| JP | 2002-64545 | 2/2002 |
| JP | 2002-271267 | 9/2002 |

(Continued)

OTHER PUBLICATIONS

Empirical Study on Locating Congested Segments over the Internet Based on Multiple End-to-End Path Measurements by Tachibana et al. 2005.*

(Continued)

*Primary Examiner* — Huy Vu
*Assistant Examiner* — Dady Chery
(74) *Attorney, Agent, or Firm* — Young & Thompson

(57) ABSTRACT

In a quality degradation (QD) portion estimating method on a network, a passive measuring unit connected with a management target network measures E2E flow quality (FQ) data on a route from a transmitting terminal connected with a different network to a receiving terminal connected with the management target network and upstream FQ data on the route from the transmitting terminal to the passive measuring unit in the management target network. A QD portion estimating section connected with the management target network collects E2E FQ data and upper stream FQ data measured by said passive measuring unit. A detecting section detects as a QD flow in the management target network, a flow related to the E2E FQ data that does not show degradation of FQ, for the upstream FQ data related to the same transmitting and receiving terminals, from among the E2E FQ data which show the degradation of FQ.

16 Claims, 16 Drawing Sheets

FOREIGN PATENT DOCUMENTS

| | | |
|---|---|---|
| JP | 2002-271392 | 9/2002 |
| JP | 2003-258903 | 9/2003 |
| JP | 2005-210515 | 8/2005 |
| JP | 2006-33715 | 2/2006 |
| JP | 2006-80584 | 3/2006 |

OTHER PUBLICATIONS

Infering link characteristics from end-to-end path meadurements by Tsuru et al. 2001.*

Masayoshi Kobayashi et al., "Flow Hinshitsu Kara no Network Hinshitsu Rekka Kasho Suitei no Mobunkatsu ni yoru Daikiboka Shuho no Teian to Hyoka", IEICE Technical Report CS2005-35, Sep. 8, 2005, vol. 105, No. 280, "2.1. Jurai Hoshiki no Gairyaku", "3. Mobunkatsu ni yoru Daikibomo eno Tekiyo Hoshiki".

Masayoshi Kobayashi et al.—Estimating points of QoS degradation in the network from the aggregation of per-flow quality information—Systems Platforms Research Laboratories, NEC Corporation—pp. 1-6.

Hajime Sugimura et al.—Packet Monitoring and Testing Methods for VoIP Networks—2001—p. 1.

Masayoshi Kobayashi et al., "Estimating points of QoS degradation in the network from the aggregation of per-flow quality information" (IEICE Technical Report, vol. 104, No. 707, IEICE, Mar. 11, 2005.

Japanese Office Action dated Dec. 2, 2010 in corresponding Japanese Application No. 2007-522279 with English translation of enclosed wavy lined portion.

United States Office Action—U.S. Appl. No. 11/993,155—Oct. 28, 2010.

* cited by examiner

Fig. 5

| | SOURCE ADDRESS | DESTINATION ADDRESS | E2E QUALITY | |
| --- | --- | --- | --- | --- |
| | | | PACKET LOSS RATE | DELAY VARIATION |
| F1 | T10 | T1 | 5% | 50ms |
| F2 | T20 | T2 | 0.1% | 10ms |
| F3 | T30 | T3 | 0.2% | 10ms |
| F4 | T40 | T4 | 7% | 10ms |
| F5 | T50 | T5 | 7% | 10ms |

Fig. 7

| PROBE POSITION | DESTINATION ADDRESS | COMMUNICATION QUALITY | |
| --- | --- | --- | --- |
| | | PACKET LOSS RATE | DELAY VARIATION |
| F2 → L100 | T2 | 0.1% | 10ms |
| F3 → L200 | T3 | 0.2% | 10ms |
| F4 → L200 | T4 | 7% | 10ms |
| F5 → L200 | T5 | 7% | 10ms |

Fig. 8

| | PROBE POSITION | RECEPTION TERMINAL ADDRESS | ROUTED LINK | | | | | | | QUALITY FLAG |
| --- | --- | --- | --- | --- | --- | --- | --- | --- | --- | --- |
| | | | L10 | L20 | L30 | L50 | L60 | L70 | L80 | |
| F2 | L100 | T2 | 1 | 1 | | 1 | | | | 1 |
| F3 | L200 | T3 | 1 | 1 | | | 1 | | | 1 |
| F4 | L200 | T4 | 1 | | 1 | | | 1 | | 0 |
| F5 | L100 | T5 | 1 | | 1 | | | | 1 | 0 |

Fig. 10

|    | SOURCE ADDRESS | RECEPTION TERMINAL ADDRESS | ROUTED LINK | | | QUALITY FLAG |
|----|----|----|----|----|----|----|
|    |    |    | L20 | L50 | L60 |    |
| F2 | L100 | T2 | 1 | 1 |   | 1 |
| F3 | L200 | T3 | 1 |   | 1 | 1 |

Fig. 15

|  | SOURCE ADDRESS | DESTINATION ADDRESS | ACTIVE MEASUREMENT QUALITY | |
|---|---|---|---|---|
|  |  |  | PACKET LOSS PERCENTAGE | DELAY VARIATION |
| AF1 → | A4 | A5 | 5% | 9ms |
| AF2 → | A5 | A4 | 0.05% | 8ms |
| AF3 → | A3 | A5 | 0.1% | 9ms |
| AF4 → | A5 | A3 | 0.1% | 9ms |
| AF5 → | A2 | A6 | 0.05% | 9ms |
| AF6 → | A6 | A2 | 0.05% | 8ms |
| AF7 → | A1 | A6 | 0.1% | 9ms |
| AF8 → | A6 | A1 | 0.1% | 9ms |

Fig. 16

| | PROBE POSITION | RECEPTION TERMINAL ADDRESS | L10 | L20 | L30 | L50 | L60 | L70 | L80 | L100 | L200 | L300 | L400 | L500 | L600 | QUALITY FLAG |
|---|---|---|---|---|---|---|---|---|---|---|---|---|---|---|---|---|
| F2 | L100 | T2 | 1 | 1 | | 1 | | | | | | | | | | 1 |
| F3 | L200 | T3 | 1 | 1 | | | 1 | | | | | | | | | 1 |
| F4 | L200 | T4 | 1 | | 1 | | | 1 | | | | | | | | 0 |
| F5 | L100 | T5 | 1 | | 1 | | | | 1 | | | | | | | 0 |
| AF1 | A4 | A5 | | | | | | | | 1 | 1 | | | | | 1 |
| AF3 | A3 | A5 | | | | | | | | 1 | | 1 | 1 | | | 0 |
| AF5 | A2 | A6 | | | | | | | | | 1 | | | 1 | | 0 |
| AF7 | A1 | A6 | | | | | | | | | 1 | | | | 1 | 0 |

Fig. 17

| | SOURCE ADDRESS | RECEPTION TERMINAL ADDRESS | ROUTED LINK | | | | QUALITY FLAG |
|---|---|---|---|---|---|---|---|
| | | | L20 | L50 | L60 | L300 | |
| F2 | L100 | T2 | 1 | 1 | | | 1 |
| F3 | L200 | T3 | 1 | | 1 | | 1 |
| AF1 | A4 | A5 | 1 | | | 1 | 1 |

METHOD OF ESTIMATING QUALITY DEGRADATION ON NETWORK IN COMMUNICATION NETWORK SYSTEM

TECHNICAL FIELD

The present invention relates to a communication network system, and more particularly relates to a quality degradation portion estimating technique of a network for detecting that degradation of communication quality has occurred in a management target network and estimating a degradation portion.

BACKGROUND ART

Typically, as the method of measuring quality of a communication network, there are two methods of an active measuring method and a passive measuring method. The active measuring method is a method of estimating the quality of the network by transmitting a test packet to the network and detecting delay and loss of the packet. On the other hand, the passive measuring method is a method of estimating the quality of the network by monitoring the state of a packet flowing through the network without transmitting any test packet. Each of them has a drawback and an advantage, and there are various specific attaining methods.

For example, in Japanese Patent Application Publication (JP-P2002-64545A) (Related Art 1) is described a passive measuring method, in which in a network system where a voice packet is transmitted from a communication system to a communication terminal through a packet communication network, the qualities such as a packet loss rate in an end-to-end (E2E) and a variation time of the voice packet between the communication system and the communication terminal are measured based on an RTCP-RR (RTP (Real-time Transport Protocol) Control Protocol-Receiver Report) packet that is returned from the communication terminal to the communication system.

Also, in Japanese Patent Application Publication (JP-P2005-210515A) (Related Art 2) is described a packet measuring method, in which a certain one point between a transmission terminal and a reception terminal is defined as a passive measurement point, and a flow between the start and end of communication between the transmission and reception terminals is extracted, and a quality data including a data of a packet loss in E2E between the transmission terminal and the reception terminal is estimated from a time series data of packet arrival at the reception terminal based on a header data having the sequence number of the packet.

On the other hand, a technique has been conventionally proposed in which degradation of flow quality is determined from a quality data of a flow through the network so as to estimate a degradation portion. For example, in Japanese Patent Application Publication (JP-P2002-271392A) (Related Art 3) is described a method of determining flows of good quality and flows of bad quality based on quality data of communication flows and a predetermined quality threshold, determining a link through which the flows of bad quality pass based on route data, and estimating a link on which the route data of the flows of bad quality overlap, as a quality degradation portion.

In a current communication network system, a plurality of networks that are managed by corporations different from each other are connected to each other, to form a large network. In such a communication network system, communication is carried out between terminals connected to different networks in addition to communication between terminals connected to the same network. The communication quality in case of the communication between the terminals connected to different networks is determined based on the communication qualities of all the networks on the route, and when the quality is deteriorated in any one network, the quality of the entire flow is deteriorated. Thus, a network manager of each network is required to early detect the degradation and carry out necessary countermeasure.

When the network manager of each network measures E2E flow quality data between transmitting and receiving terminals, which are connected to the network administrated by the network manager, by the passive measuring method in order to detect degradation in the communication quality in the network administrated by the network manager, if the degradation of quality is detected in the E2E flow quality data between the transmitting and receiving terminals, the network manager can instantly determine that there is a cause in the network. However, when any one of the terminals is connected to another network, the network manager cannot determine whether a cause exists in the network or the other network, even if the degradation of quality is detected in the E2E flow quality data between the transmitting and receiving terminals. This reason is that even if the quality degradation exists in the network, or the quality degradation exists in the other network, the measured E2E flow quality data exhibits the degradation in both the cases.

Also, when by applying the technique indicated in the related art 3 to the flow extending over the plurality of networks, and determining links through which the flow of the bad quality passes from the route data, one of the links in which the route data of flows of the had qualities overlap is estimated as a quality degradation portion, it is possible to determine whether the quality degradation portion exists in the network or in another network. However, although the route data of the network managed by a certain network manager can be generally used by the network manager, the route data of the network that is not managed by the network manager itself (the other network) cannot be used by the network manager. Thus, it is difficult to apply the technique indicated in the related art 3 to the flow extending over the plurality of networks.

In this way, among the E2E flow quality data which is measured by the passive measuring method in communication between the transmitting and receiving terminals, the E2E flow quality data when any one of the transmitting and receiving terminals exists in another network cannot be conventionally used for the quality management of the network at all.

DISCLOSURE OF INVENTION

The present invention is proposed in view of the above environments. It is therefore an object of the present invention to provide a communication network system in which among E2E flow quality data that are measured by a passive measuring method in communication between transmitting and receiving terminals, the E2E flow quality data when the transmitting terminal exists in a different network can be used to detect the occurrence of degradation in communication quality in a management target network and estimate a degradation portion, and a quality degradation portion estimating method of the network.

A first network quality degradation portion estimating method of the present invention includes: a passive measuring unit connected to a management target network measuring E2E flow quality data on a route between a transmitting terminal connected to a different network and a receiving terminal connected to a management target network and upstream flow quality data on the route between the transmitting terminal and the passive measuring unit; a quality degradation portion estimating unit connected to the management target network collecting the E2E flow quality data and the upstream flow quality data, which are measured by the passive measuring unit; and detecting a flow related to the E2E flow quality data that does not show the degradation of flow quality, for the upstream flow quality data related to the same transmitting and receiving terminals from among the E2E flow quality data showing the degradation of flow quality, as the quality degradation flow in the management target network.

A second network quality degradation portion estimating method of the present invention includes: a passive measuring unit connected to a management target network measuring E2E flow quality data on a route between a transmitting terminal connected to a different network and a receiving terminal connected to the management target network and upstream flow quality data on the route between the transmitting terminal and the passive measuring unit; active measuring units arranged at a boundary point with the different network in the management target network and a passive measurement point of the passive measuring unit measuring a flow quality data between the boundary point and the passive measurement point; a quality degradation portion estimating unit connected to the management target network collecting the E2E flow quality data and upstream flow quality data that are measured by the passive measuring unit, and the flow quality data measured by the active measuring unit; and detecting a flow related to the E2E flow quality data that does not show the degradation of flow quality, for the upstream flow quality data related to the same transmitting and receiving terminals, from among the E2E flow quality data showing the degradation of flow quality and a flow that shows the degradation of flow quality from among the flow quality data between the boundary point and the passive measurement point as quality degradation flows in the management target network.

A first communication network system of the present invention includes a passive measuring unit that is connected to a management target network and measures E2E flow quality data on a route between a transmitting terminal connected to a different network and a receiving terminal connected to the management target network and upstream flow quality data on the route between the transmitting terminal and the passive measuring unit; and a quality degradation portion estimating unit that is connected to the management target network and collects the E2E flow quality data and the upstream flow quality data, which are measured by the passive measuring unit, and detects a flow related to the E2E flow quality data that does not show degradation of flow quality for the upstream flow quality data related to the same transmitting and receiving terminals from among the E2E flow quality data showing the degradation of flow quality, as a quality degradation flow in the management target network.

A second communication network system of the present invention includes a passive measuring unit that is connected to a management target network and measures E2E flow quality data on a route between a transmitting terminal connected to a different network and a receiving terminal connected to the management target network and upstream flow quality data on the route between the transmitting terminal and the passive measuring unit; active measuring units that are arranged at the boundary point with the different network in the management target network and a passive measurement point of the passive measuring unit and measures a flow quality data on the route between the boundary point and the passive measurement point; and a quality degradation portion estimating unit that is connected to the management target network and collects the E2E flow quality data and upstream flow quality data, which are measured by the passive measuring unit, and a flow quality data measured by the active measuring unit, and then detects a flow related to the E2E flow quality data that does not show degradation of flow quality, for the upstream flow quality data related to the same transmitting and receiving terminals from among the E2E flow quality data showing the degradation of flow quality, and a flow that shows the degradation of flow quality in the flow quality data between the boundary point and the passive measurement point, as quality degradation flows in the management target network.

A first quality degradation portion estimating apparatus of the present invention includes a collecting section that collects E2E flow quality data on a route between a transmitting terminal connected to a different network and a receiving terminal connected to a management target network, and upstream flow quality data on the route between the transmitting terminal and the passive measurement apparatus, which are measured by a passive measuring unit connected to the management target network; and a degradation flow detecting unit that detects a flow related to the E2E flow quality data that does not show degradation of flow quality for the upstream flow quality data related to the same transmitting and receiving terminals among the E2E flow quality data showing the degradation of flow quality, as a quality degradation flow in the management target network, based on the collected E2E flow quality data and upstream flow quality data.

A second quality degradation portion estimating apparatus of the present invention includes a collecting section configured to collect E2E flow quality data on a route between a transmitting terminal connected to a different network and a receiving terminal connected to a management target network, and upstream flow quality data on the route between the transmitting terminal and a passive measuring unit, which are measured by the passive measuring unit connected to the management target network, and a flow quality data on the route between a boundary point with the different network in the management target network and the passive measurement point of the passive measuring unit, which is measured by active measuring units arranged at the boundary point and the passive measurement point; and a degradation flow detecting unit that detects a flow related to the E2E flow quality data that does not show degradation of flow quality for the upstream flow quality data related to the same transmitting and receiving terminals from among the E2E flow quality data showing the degradation of flow quality, and a flow exhibiting the degradation of flow quality from among the flow quality data on the route between the boundary point and the passive measurement point, as a quality degradation flow in the management target network, based on the collected E2E flow quality data, upstream flow quality data and flow quality data.

From the passive measurement result of the flow in which the transmitting terminal exists in the different network, it is possible to estimate whether or not a degradation portion exists in the management target network. If the degradation portion is determined to exist in the management target network, route data of the management target network is used to estimate the quality degradation portion in the management target network. In this case, an estimation region is a route between the passive measurement point and the receiving terminal. When the quality degradation portion on the route between the passive measurement point and the boundary point with the different network is also estimated, the active measurement results measured by the active measuring units which are arranged at the passive measurement point and the boundary point are used.

BRIEF DESCRIPTION OF DRAWINGS

FIG. 5 is a table showing an example of E2E flow quality data for passive measurement in the first exemplary embodiment of the present invention;

FIG. 7 is a table showing an example of flow quality data determined from the E2E flow quality data and the upstream flow quality data in the first exemplary embodiment of the present invention;

FIG. 8 is flow quality/routed link table in the first exemplary embodiment of the present invention;

FIG. 10 is a diagram showing one example of the flow quality/routed link table in after a non-degradation link removal in the first exemplary embodiment of the present invention;

FIG. 15 is a table showing one example of active measurement results in the second exemplary embodiment of the present invention;

FIG. 16 is a diagram showing one example of the flow quality/routed link table in the second exemplary embodiment of the present invention; and FIG. 17 is a diagram showing one example of the flow quality/routed link table after removal of non-degradation links in the second exemplary embodiment of the present invention.

BEST MODE FOR CARRYING OUT THE INVENTION

A communication network system and a network quality degradation portion estimating method according to exemplary embodiments of the present invention will be described below with reference to the attached drawings.

First Exemplary Embodiment

Figure 1:
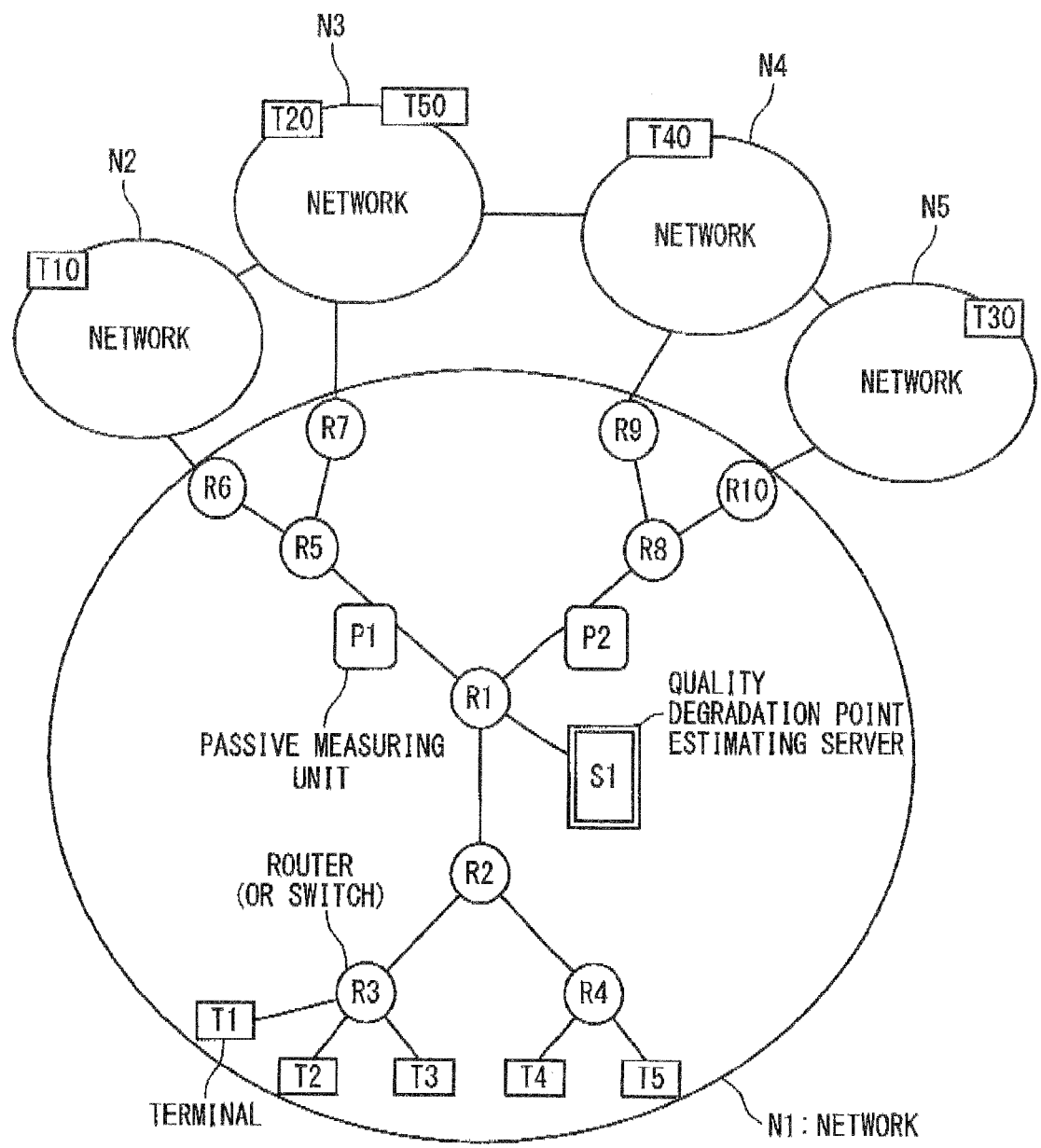
FIG. 1 is a block diagram showing a configuration of a communication network system according to a first exemplary embodiment of the present invention.

FIG. 1 is a block diagram showing the configuration of the communication network system according to a first exemplary embodiment of the present invention. With reference FIG. 1, a network N1 is a management target network targeted for estimation of a network quality degradation portion. Routers (or switches) R1 to R10 are arranged, and terminals T1 to T5 and a quality degradation portion estimating server S1 and passive measuring units P1 and P2 are connected. Also, the network N1 is connected to other networks N2 to N5, and terminals T10, T20, T30, T40 and T50 are connected to the other networks N2 to N5.

Each of the passive measuring units P1 and P2 has a first passive measuring function for passively measuring E2E flow quality data between a transmitting terminal and a receiving terminal, and a second passive measuring function for measuring upstream flow quality data between the transmitting terminal and the passive measuring unit.

A specific example of the first passive measuring function of each of the passive measuring units P1 and P2 is a method of collecting packets (RR packets and the like) in a protocol (RTCP and the like) in which the receiving terminal for a flow returns reception quality of the flow (the number of packet losses, a packet loss rate, and a variation of time interval between reception packets) to the transmitting terminal, or ACK packets of TOP (these packets are referred to as quality feedback packets) and then determining communication quality, written in the quality feedback packets, of the entire route between the transmitting terminal and the receiving terminal, in short, E2E communication quality (this is referred to as an E2E quality estimating method).

Each of the passive measuring units P1 and P2 periodically notifies E2E flow quality data, which is measured by using the first passive measuring function, to the quality degradation portion estimating server S1. The notified E2E flow quality data includes data (such as an address of the transmitting terminal, an address of the receiving terminal, and a data of communication quality). The data of the communication quality is a data of communication quality such as the packet loss rate, the burst property of a packet loss, a reception rate, and delay jitter.

A specific example of the second passive measuring function of each of the passive measuring units P1 and P2 is a method of determining the communication quality, such as the number of packet losses and variation of packet delays, on a route between the transmitting terminal and the passive measurement point and the variation of packet delay, from known data of a packet sequence in the communication flow transmitted from the transmitting terminal (a sequence number, the number of transmission packets per unit time, and a variation of time intervals between the transmission packets) and data of the packet sequence in the communication flow from the transmitting terminal which is measured at the passive measurement point (the sequence number, the number of pass packets per unit time, and a variation of passage packets) (this is referred to as an upstream quality estimating method).

Each of the passive measuring units P1 and P2 periodically notifies the upstream flow quality data, which is measured by using the second passive measuring function, to the quality degradation portion estimating server S1. The notified upstream flow quality data includes a data (such as an identifier of a link to which the passive measuring unit is connected, an address of the transmitting terminal, an address of the receiving terminal, and a data of communication quality).

The data of communication quality is such as a packet loss rate, a burst property of the packet loss, a reception rate, and a delay jitter.

The quality degradation portion estimating server S1 collects the E2E flow quality data and the upstream flow quality data from each of the packet measuring units P1 and P2 in the network N1 and also collects route data from the respective routers R1 to R10, and detects the generation of the degradation of communication quality in the network N1 and then estimates the quality degradation portion.

Figure 2:
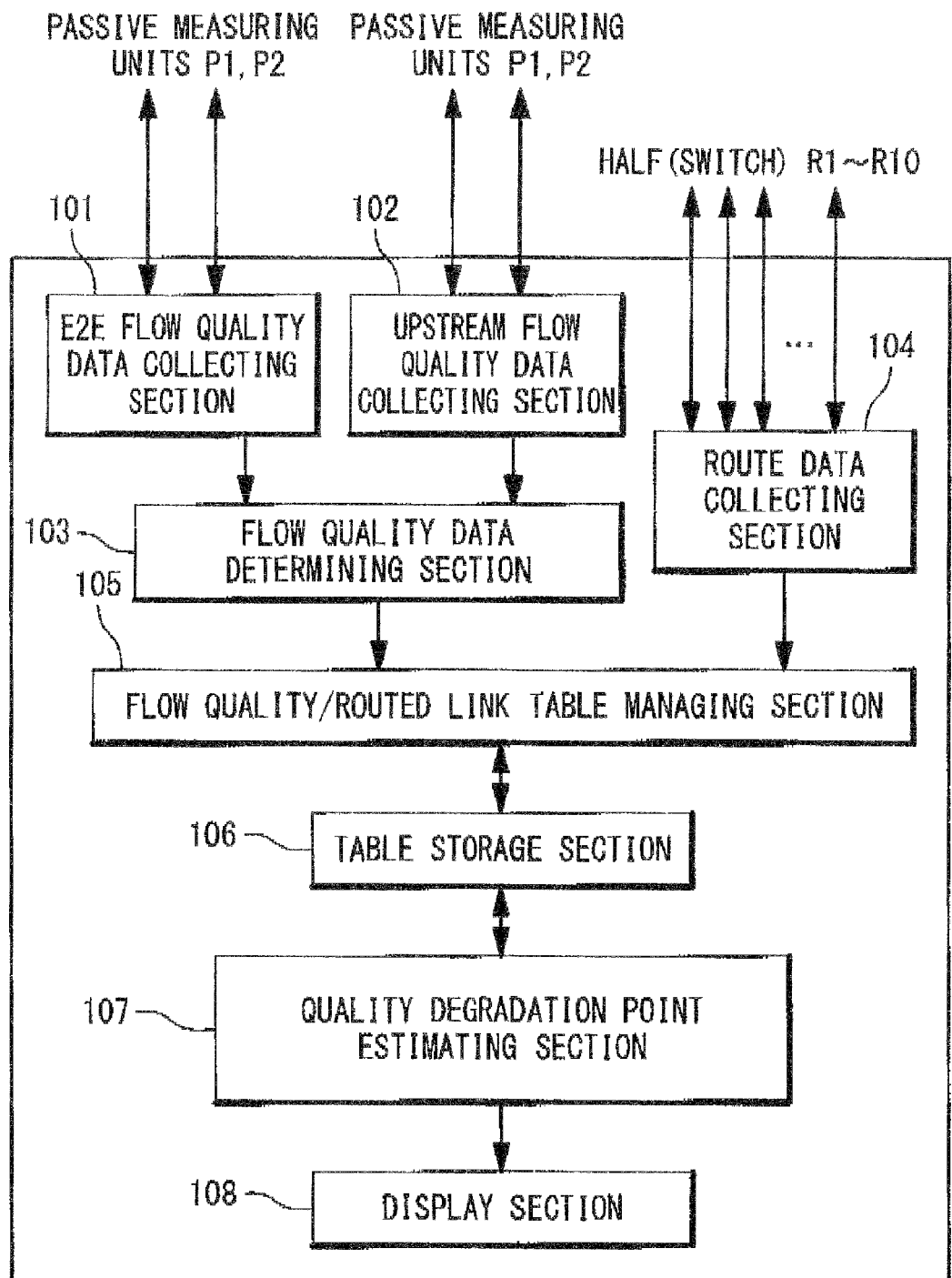
FIG. 2 is a block diagram of a quality degradation portion estimating server in the first exemplary embodiment of the present invention.

With reference to FIG. 2, one example of the quality degradation portion estimating server S1 contains an E2E flow quality data collecting section 101, upstream flow quality data collecting section 102, a flow quality data determining section 103, a route data collecting section 104, a flow quality/routed link table managing section 105, a table storage section 106, a quality degradation portion estimating section 107 and a display section 108.

The E2E flow quality data collecting section 101 receives the E2E flow quality data periodically notified from the passive measuring units P1 and P2. As mentioned above, the E2E flow quality data includes the data (such as the address of the transmitting terminal, the address of the receiving terminal and the data of communication quality).

The upstream flow quality data collecting section 102 receives the upstream flow quality data periodically notified from the passive measuring units P1 and P2. As mentioned above, the upstream flow quality data includes the data (such as the identifier of the link to which the passive measuring unit is connected, the address of the transmitting terminal, the address of the receiving terminal, and the data of communication quality).

The flow quality data determining section 103 receives the E2E flow quality data from the E2E flow quality data collecting section 101 and receives the upstream flow quality data from the upstream flow quality data collecting section 102. With respect to the E2E flow quality data and upstream flow quality data when it is indicated based on the address of the transmitting terminal and the address of the receiving terminal that the transmitting terminal exists in any of other networks N2 to N5 and the receiving terminal exists in the network N1, the flow quality data determining section 103 extracts the E2E flow quality data that the degradation of flow quality is not indicated in the upstream flow quality data related to the same transmitting and receiving terminals among the E2E flow quality data, and then notifies it to the flow quality/routed link table managing section 105, together with an identifier of the link to which the passive measuring unit is connected. Specifically, the flow quality data determining section 103 executes the following process on all the E2E flow quality data in which the transmitting terminal exists in the other networks N2 to N5 and the receiving terminal exists in the network N1.

(1) Step 1:
The upstream flow quality data to the same transmitting and receiving terminals as the transmitting and receiving terminals of the E2E flow quality data is searched, and if it does not exist, the process about the E2E flow quality data is ended, and if it exists, a step 2 is executed.

(2) Step 2:
Whether or not the communication quality of the existing upstream flow quality data is good is determined by comparing with a predetermined condition of a flow of good quality, and if it is not good (if the quality is deteriorated), the process about the E2E flow quality data is ended, and if it is good, a step 3 is executed.

(3) Step 3:
The flow quality data of the identifier of the link connected to the passive measuring unit and included in the upstream flow quality data of good quality, the address of the receiving terminal, and the quality data of the E2E flow quality data is notified to the flow quality/routed link table managing section 105.

The route data collecting section 104 collects routing data, namely, a data of a routing from the routers (or switches) R1 to R10 in the network N1. Specifically, the collected data are a routing tables and an ARP table when they are collected from the routers, and the collected data are a forwarding database and a configuration data of a spanning tree when they are collected from the switch. They can be collected by using SMTP (Simple Network Management Protocol) and the like. If there is a data of routing, the route through which the communication between the transmitting and receiving terminals is carried out can be determined from the address data of the transmitting and receiving terminals. It should be noted that the data of routing can be given by a network manager without any collection from the routers (or switches) R1 to R10.

The flow quality/routed link table managing section 105 manages the communication quality and a data of routed links in the flow carried out currently by using a table based on the flow quality data obtained from the flow quality data determining section 103 and a data of routing obtained from the route data collecting section 104. The table used in this management is referred to as a flow quality/routed link table. Specifically, the flow quality/routed link table holds an identifier of the link to which the passive measuring unit is connected, the address of the receiving terminal, a link set through which the flow is currently routed, and a quality flag indicating the current communication quality of the flow, for each flow in which the communication is currently carried out.

Figure 3:
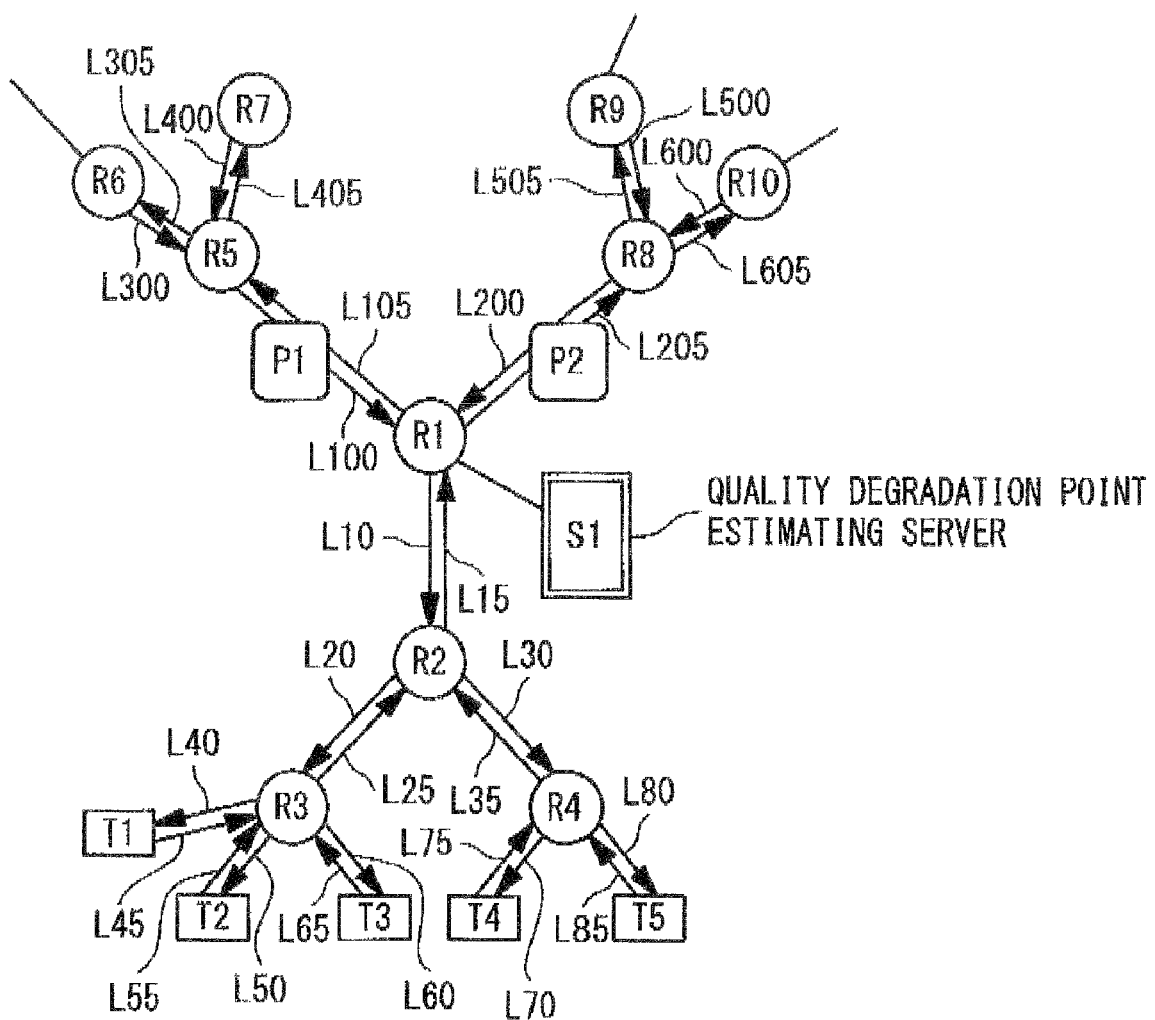
FIG. 3 is a diagram showing links in a communication network system according to the first exemplary embodiment of the present invention.

Here, the link is a directional link between the routers (or switches) or between the route (or switch) and the terminal. For example, in case of the network N1 in FIG. 1, it is the directional link Li (i is an integer) shown in FIG. 3.

The quality flag takes any of three states of 1, 0 and indefinite (hereinafter, to be represented as N/A). For example, a quality index is determined from the packet loss rate, the burst property of the packet loss, the reception rate, the delay jitter and the like, which are included in the communication quality data of the flow quality data. If this determined quality index is equal to or higher than a predetermined bad state threshold, the quality flag is set to "1" to indicate the degradation. Also, if the determined quality index is equal to or less than a predetermined good state threshold, the quality flag is set to "0" to indicate that it is not deteriorated. If the determined quality index is not the above cases, the quality flag is set to N/A. The quality index may be simply determined from one (for example, the packet loss rate) of the communication quality data. Or, in case of a flow of VoIP, an R value is determined based on E-Model of G.107 of an ITU-T recommendation from the packet loss rate and the delay jitter and the like, and it may be used as the quality index.

The table storage section 106 stores the flow quality/routed link table.

The quality degradation portion estimating section 107 periodically reads the flow quality/routed link table from the table storage section 106 and estimates a quality degradation portion based on the data of the routed links of the flow in which the quality flag is set to "1" to outputs to the display section 108. As the estimating method of the quality degradation portion, it is possible to employ the method described in the related art 3. However, in order to make an estimation precision higher, it is preferable to use the following minimum link number estimating method and maximum probability estimating method.

The minimum link number estimating method is a method of estimating, as the quality degradation portion, network components included in a combination in which the number of components is minimum, among all of combinations of the network components which may generate the quality degradation in the flow. The reason why the combination in which the number of components is minimum is selected is in that, when probabilities that the qualities of the respective network components are deteriorated are assumed to be equal, the combination in which the number of components is minimum has the highest probability.

On the other hand, the maximum probability estimating method is a method of estimating, as the quality degradation portion, network components included in a combination in which the generation probability of the quality degradation is the highest among all of combinations of the network components which may generate the quality degradation in the flow. The quality degradation probability of each network component is set in advance. When the quality degradation probabilities of the respective network components are assumed to be equal, it is equivalent to that of the minimum link number estimating method.

The display section 108 is provided with a display to display the quality degradation portion estimated by the quality degradation portion estimating section 107 to the network manager. The display for specifying the quality degradation portion may be shown by using a text such as the address of the link, or may be graphically shown on a network diagram.

The operation of the first exemplary embodiment will be described below.

Figure 4:
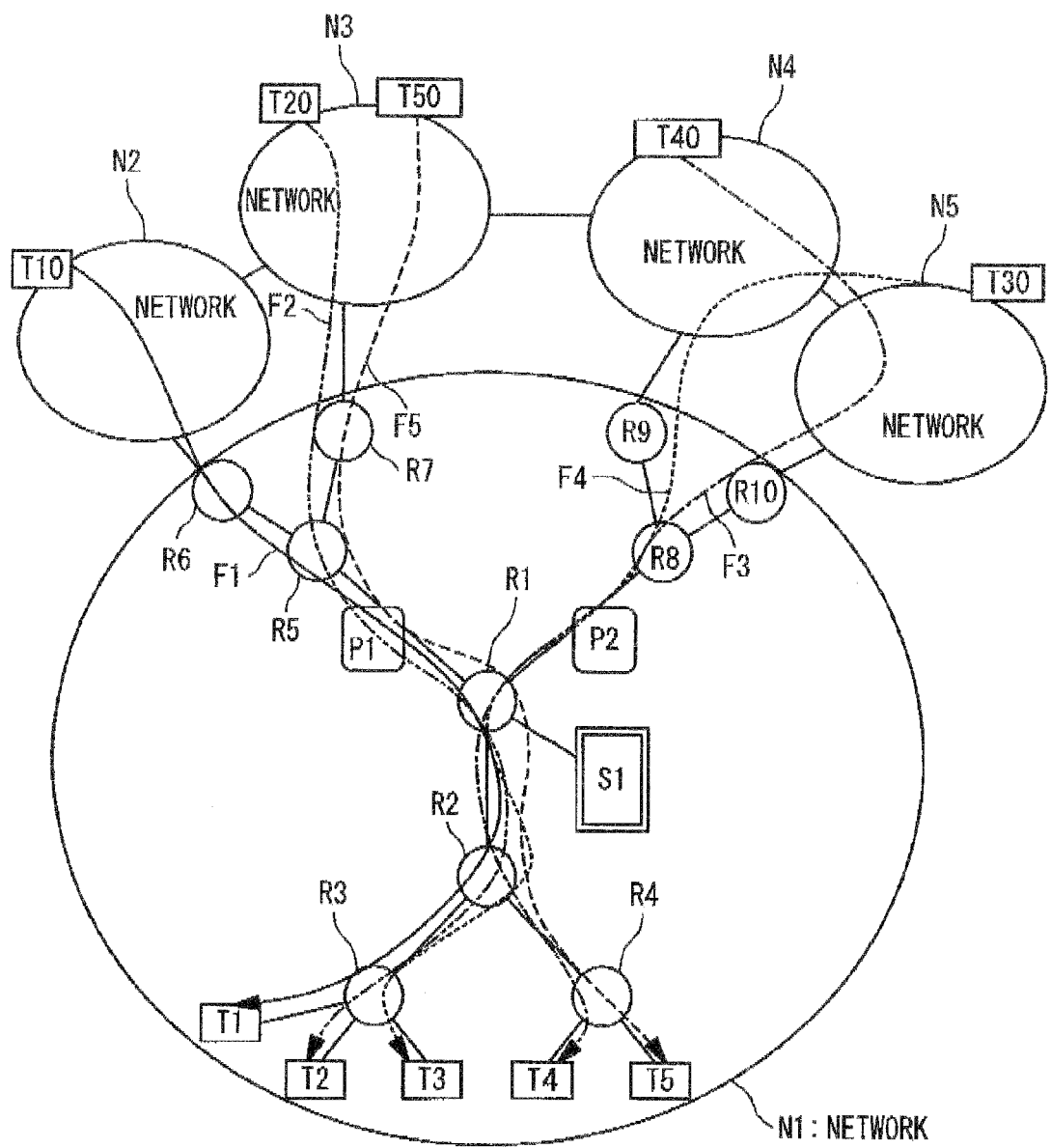
FIG. 4 is a diagram showing an example of flows flowing through the communication network system according to the first exemplary embodiment of the present invention.

Now, it is supposed that flows F1 to F5 shown in FIG. 4 present on the communication network system shown in FIG. 1. All of the flows F1 to F5 are user flows in which the terminals T10, T20, T30, T40 and T50 connected to the networks other than the management target network N1 are used as the transmitting terminals, and the terminals T1, T2, T3, 24 and T5 connected to the management target network N1 are used as the receiving terminals.

The passive measuring unit P1 measures the E2E flow quality data and the upstream flow quality data for the flows F1, F2 and F5 to notify to the E2E flow quality data collecting section 101 and the upstream flow quality data collecting section 102 in the quality degradation portion estimating server S1. Also, the passive measuring unit P2 measures the E2E flow quality data and the upstream flow quality data for the flows F3 and F4 to notify to the E2E flow quality data collecting section 101 and the upstream flow quality data collecting section 102 in the quality degradation portion estimating server S1. The E2E flow quality data collecting section 101 in the quality degradation portion estimating server S1 notifies the E2E flow quality data received from the passive measuring units P1 and P2 to the flow quality data determining section 103. The upstream flow quality data collecting section 102 notifies the upstream flow quality data received from the passive measuring units P1 and P2 to the flow quality data determining section 103.

Figure 6:
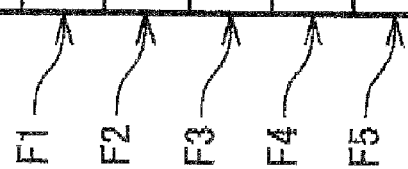
FIG. 6 is a table showing an example of upstream flow quality data for passive measurement in the first exemplary embodiment of the present invention.

FIG. 5 shows one example of the E2E flow quality data notified to the flow quality data determining section 103 from the E2E flow quality data collecting section 101. FIG. 6 shows one example of the upstream flow quality data notified to the flow quality data determining section 103 from the upstream flow quality data collecting section 102. Here, the packet loss rate and the delay variation are used as the communication quality.

The flow quality data determining section 103 executes the above step 1 to step 3 on all of the E2E flow quality data of the flows in which the transmitting terminal exists in the other networks N2 to N5 and the receiving terminal exists in the network N1. The flow quality data determining section 103 extracts the E2E flow quality data that does not show the degradation of flow quality in the upstream flow quality data related to the same transmitting and receiving terminals, among the E2E flow quality data and notifies it to the flow quality/routed link table managing section 105 together with the identifier of the link to which the passive measuring unit is connected. Specifically, when the flow in which the packet loss rate is 1% or less and the delay variation is 60 ms or less is assumed to be the condition of the good flow, the flow F1 in the first row of FIG. 6 is removed from a notice to the flow quality/routed link table managing section 105, because the upstream flow quality in the first row of FIG. 5 related to the same transmitting and receiving terminals is not good. On the other hand, the flows F2 to F5 in the remaining second to fifth rows of FIG. 6 are targeted for the notice to the flow quality/routed link table managing section 105, because the upstream flow quality in the second to fifth rows of FIG. 5 related to the same transmitting and receiving terminals is good. As a result, the data shown in FIG. 7 is notified to the flow quality/routed link table managing section 105.

The flow quality/routed link table managing section 105 maintains the flow quality/routed link table provided with the identifier of the link to which the passive measuring unit is connected, the address of the receiving terminal, the link set through which flows are currently routed, and the quality flag indicating the current communication quality of each flow, for the flows in which the communications are currently carried out, based on the flow quality data obtained from the flow quality data determining section 103 and the data of routing from the route data collecting section 104. For example, when the packet loss rate is defined as the quality degradation index, the bad state threshold is 3%, and the good state threshold is 1%, if the flow quality data shown in FIG. 7 is obtained from the flow quality data determining section 103, this results in the flow quality/routed link table shown in FIG. 8. It should be noted that in FIG. 8, the links in which "1" is set in the column of the routed link are the routed links of the flows.

Figure 9:
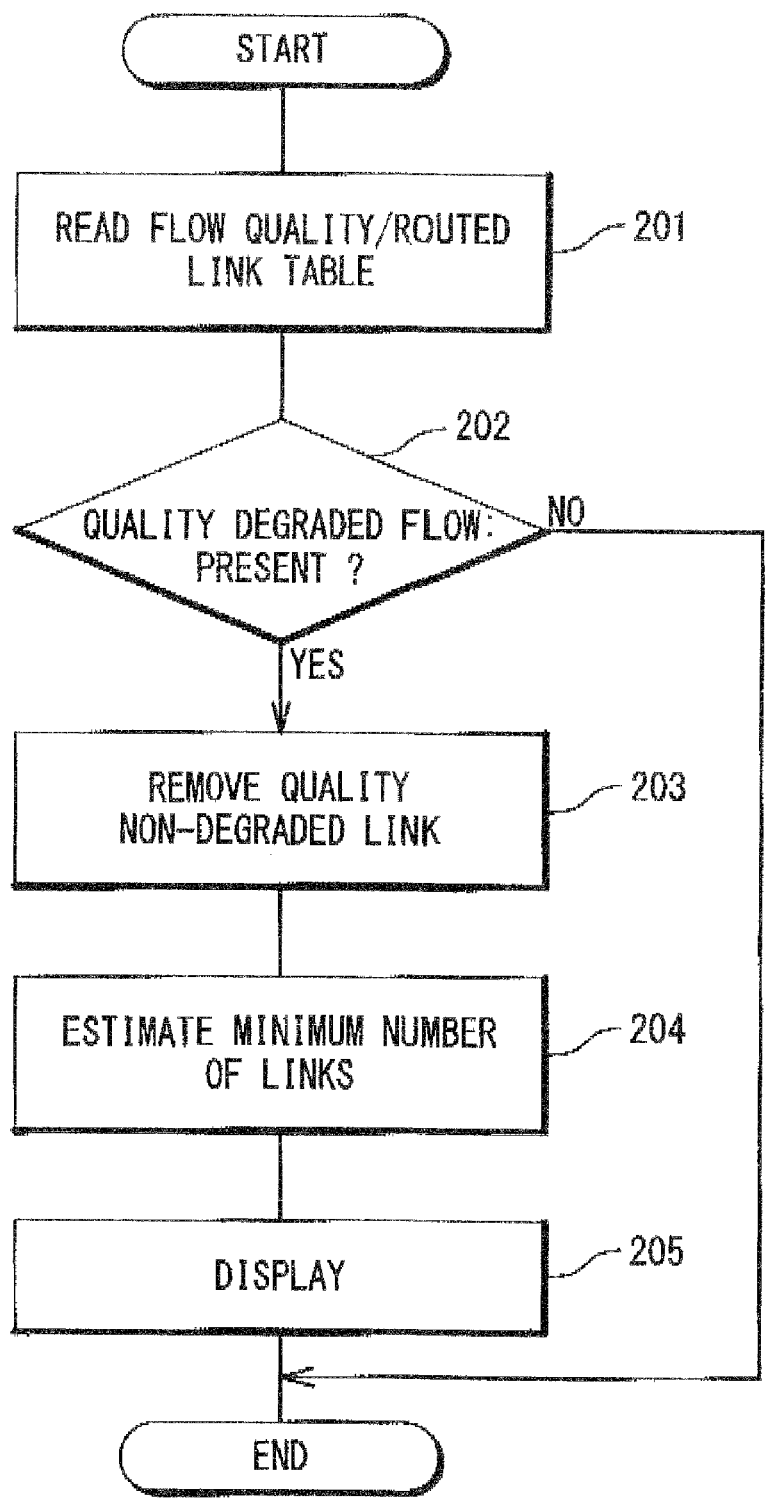
FIG. 9 is a flowchart showing an operation of a quality degradation portion estimating section in the first exemplary embodiment of the present invention.

The quality degradation portion estimating section 107 estimates the quality degradation portion based on the flow quality/routed link table shown in FIG. 8 an displays its result on the display section 108. FIG. 9 shows an operation flowchart of the quality degradation portion estimating section 107 when the minimum link number estimating method is used.

At first, the quality degradation portion estimating section 107 reads the flow quality/routed link table from the table storage section 106 (Step 201). Subsequently, whether or not the quality degradation flow in which the quality flag is set to "1" exists in the flow quality/routed link table is determined (Step 202). If the quality degradation flow does not exist, the process for this time is ended.

If one or more quality degradation flows exist, a quality non-degradation link is removed (Step 203). After that, the minimum link number estimating method is performed to estimate the quality degradation portion (Step 204), and its result is displayed on the display section 108 (Step 205).

The removal of the quality non-deteriorated link executed at the step 203 is to remove the same links as the routed links of the flow in which "0" is set to the quality flag, from the routed links for the flow in which "1" is set to the quality flag. For example, when the flow quality/routed link table has the content shown in FIG. 8, the flows F4 and F5 are the good flows (the quality flag set to 0), and links L10, L30, L70 and L80 through which the flows F4 and F5 routed are considered not to show the quality degradation. Thus, they are removed from the routed links of the flows F2 and F3 in which the quality flags are set to "1". As a result, the flow quality/routed link table is as shown in FIG. 10.

The minimum link number estimating method executed at the step 204 will be described below. At first, for a sequence of routed links of the flow quality/routed link table, a set of flows for which "1" has been set is referred to as a flow set belonging to the link sequence. For example, in case of the flow quality/routed link table shown in FIG. 10, the flow set belonging to the sequence of routed links L20 is {F2, F3}. Moreover, a summation set of the flow sets belonging to a plurality of sequences of routed links is similarly referred to as the flow set belonging to the set of those link sequence. For example, in case of the flow quality/routed link table shown in FIG. 10, the flow set belonging to sets {L50, L60} of the link sequence is {F2, F3}.

The minimum link number estimating method executes the following step 1 to step 3.
Step 1:
Only the flow whose quality flag has been set to "1" is extracted from the flow quality/routed link table.
Step 2:
The set composed of the minimum number of the elements is selected from the sets of the routed link sequence in which the flow set belonging to the sets of the routed link sequence is same as the flow extracted at the step 1.
Step 3:
The routed link set (the plurality of routed link sets are allowable) obtained at the step 2 is outputted as the result.

For example, as for the flow quality/routed link table shown in FIG. 10, the execution of the minimum link number estimating method will be described below. At first, since the quality flags on all the rows are "1" in this table, all flows {F2, F3} are extracted at the step 1. Subsequently, when the step 2 is executed, as the set of the routed link sequences in which the flow sets belonging to the set of the routed link sequences are {F2, F3}, there are {L20} and {L50, L60}. However, the set having the minimum number of the elements is {L20} (the number of the elements is 1). At the step 3, {L20} is outputted as the result of the minimum link number estimating method. It should be noted that the step 2 can be solved by using an algorism of a minimum coverage problem.

Figure 11:
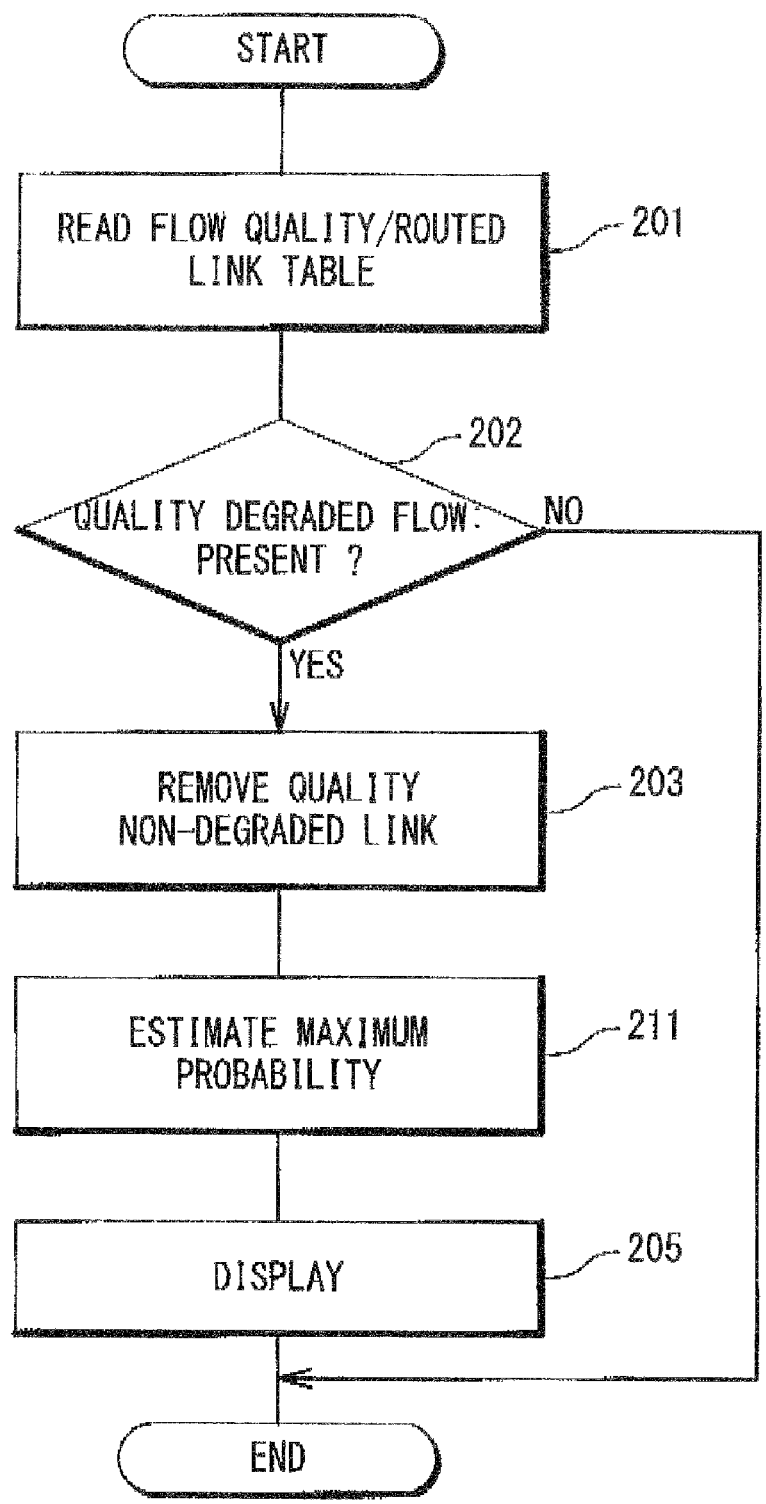
FIG. 11 is a flowchart showing another operation of the quality degradation portion estimating section in the first exemplary embodiment of the present invention.

The above description is about the operation of the quality degradation portion estimating section 107 when the minimum link number estimating method is used. However, the operation of the quality degradation portion estimating section 107 when the maximum probability estimating method is used is as shown in FIG. 11. As compared with the flowchart in FIG. 9, the step 211 of the maximum probability estimation is executed instead of the step 204 of the minimum link number estimating method. In case of using the maximum probability estimating method, when the degradation of communication quality was previously generated, a probability resulting in its cause is stored in a quality degradation cause probability table for each of the links in the management target network N1. This quality degradation cause probability table is stored in the table storage section 106.

The maximum probability estimating method executes the following step 1 to step 3.
Step 1:
Only the flow whose quality flag is set to 1 is extracted from the flow quality/routed link table.
Step 2:
A set in which the estimation generation probability is maximum is selected from the sets of routed link sequences in which the flow set belonging to the sets of routed link sequences is the same as the flow extracted at the step 1. Here, the estimation generation probability is such that the probabilities resulting in the quality degradation cause of the respective links, which are stored in the quality degradation cause probability table, are multiplied with each other.
Step 3:
The routed link set (the plurality of routed link sets are allowable) obtained at the step 2 is outputted as the result.

According to this exemplary embodiment, when the transmitting terminal exists in another network and the receiving terminal exists in the management target network N1, the generation of the degradation of communication quality in the management target network N1 can be detected by using the E2E flow quality data between the transmitting and receiving terminals, which are measured by the passive measuring units P1 and P2 dispersedly arranged in the management target network N1. As its reason, the upstream flow quality data between the transmitting terminal and the passive measuring units P1 and P2 is measured, simultaneously with the measurement of the E2E flow quality data between the transmitting terminal and the receiving terminal, and a flow related to the E2E flow quality data that does not show the degradation of flow quality in the upstream flow quality data related to the same transmitting and receiving terminals is detected as the quality degradation flow in the management target network from among the E2E flow quality data showing the degradation of flow quality.

Also, according to this exemplary embodiment, when the transmitting terminal exists in the other network and the receiving terminal exists in the management target network N1, a quality degradation portion in the management target network N1 can be estimated by using the E2E flow quality data between the transmitting and receiving terminals, which are measured by the passive measuring units P1 and P2 dispersedly arranged in the management target network N1. As its reason, the upstream flow quality data between the transmitting terminal and the passive measuring units P1 and P2 is measured, simultaneously with the measurement of the E2E flow quality data between the transmitting terminal and the receiving terminal, and the flow related to the E2E flow quality data that does not show the degradation of flow quality in the upstream flow quality data related to the same transmitting and receiving terminals is detected as the quality degradation flow in the management target network from among the E2E flow quality data showing the degradation of flow quality, and the quality degradation portion in the management target network N1 is estimated based on the quality degradation flow in the management target network and the route data of the management target network N1.

Modification of First Exemplary Embodiment

In the first exemplary embodiment, a flow in which the transmitting terminal exists in another network and the receiving terminal exists in the management target network N1 is used among the flows flowing through the management target network N1. In addition, any one of (1) a flow when both of the transmitting terminal and the receiving terminal exist in the management target network N1, and (2) a flow in which the transmitting terminal exists in the management target network N1 and the receiving terminal exists in another network, or both of them may be used to estimate the quality degradation portion.

When the flow in case of (1) is used, the E2E flow quality data itself is used, and when the flow in case of (2) is used, the upstream flow quality data is used. That is, the flow quality data determining section 103 in the quality degradation portion estimating server S1 notifies the E2E flow quality data related to the flow as the flow quality data to the flow quality/routed link table managing section 105, when both of the transmitting and receiving terminals exist in the management target network N1, and notifies the upstream flow quality data between the transmitting and receiving terminals as the flow quality data to the flow quality/routed link table managing section 105 when the transmitting terminal exists in the management target network N1 and the receiving terminal exists in the other network. The flow quality/routed link table managing section 105 deals with them similarly to the flow when the transmitting terminal exists in different network. However, the set of "Probe Position and Transmission Destination Address" in FIG. 7 is a set of "Transmission Source Address and Transmission Destination Address", in the flow when both of the transmitting and receiving terminals exist in the management target network N1, and is a set of "Transmission Source Address and Probe Position", in the flow when the receiving terminal exists in the other network.

Also, in the first exemplary embodiment, the quality non-degradation link is removed before the minimum link number estimating method or maximum probability estimating method is executed. However, although the precision becomes poor, the process for removing this quality non-degradation link may be omitted.

Second Exemplary Embodiment

Figure 12:
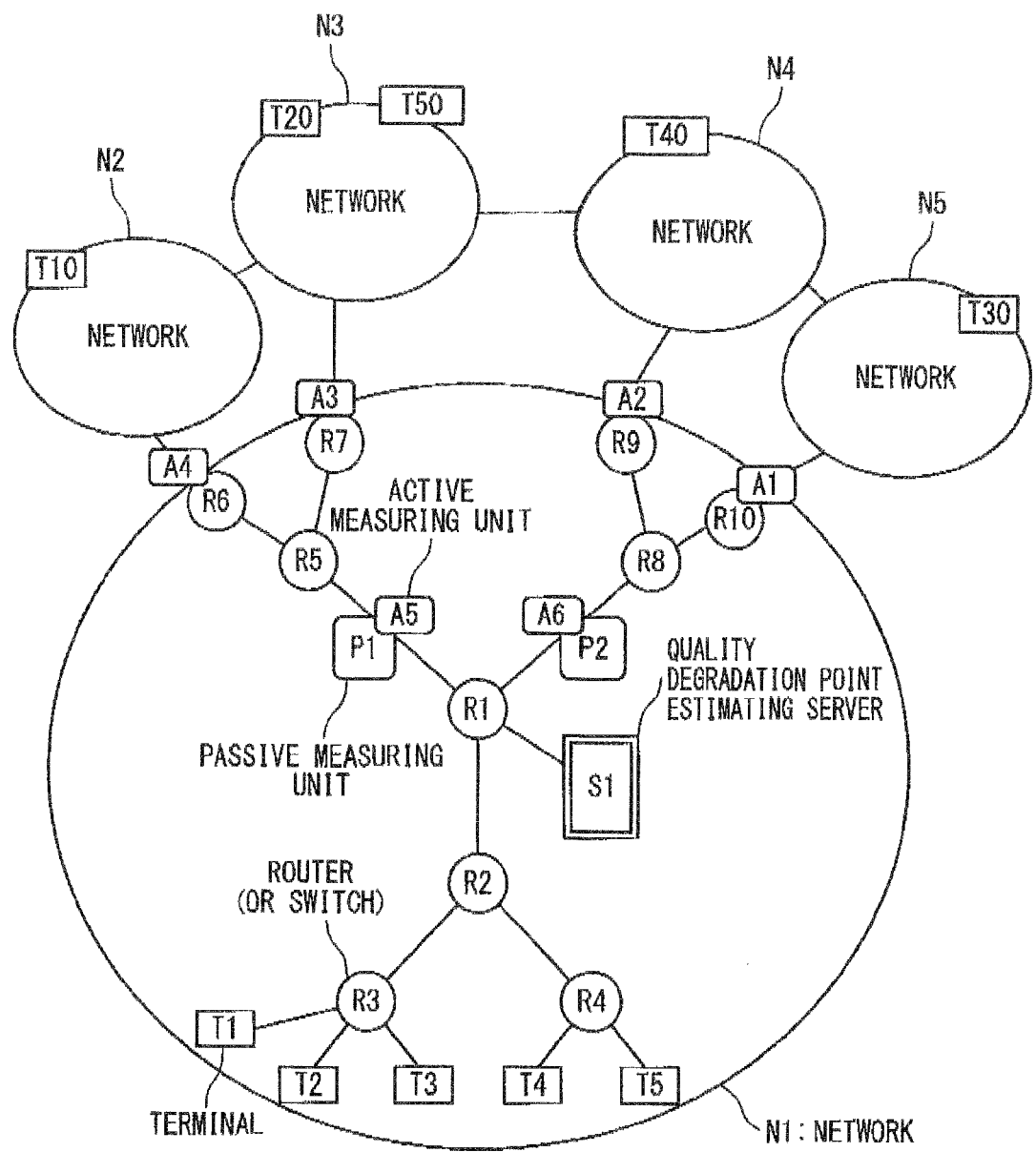
FIG. 12 is a block diagram showing a configuration of the communication network system according to a second exemplary embodiment of the present invention.

With reference to FIG. 12, the communication network system according to a second exemplary embodiment of the present invention differs from the first exemplary embodiment shown in FIG. 1, in that active measuring units A5 and A6 are arranged at the same points as the passive measurement points of the passive measuring units P1 and P2 dispersedly arranged in the management target network N1, that active measuring units A1 to A4 are arranged at the boundary points with different networks, and that the quality degradation portion estimating server S1 collects the E2E flow quality data and the upstream flow quality data from the passive measuring units P1 and P2 and further collects the actively-measured quality data from the active measuring units A1 to A6.

Each of the active measuring units A1 to A5 has a function of sending a test packet between the unit and a different active measuring unit, consequently measuring the communication quality between them, and then transmitting the measurement result to the quality degradation portion estimating server S1. The measurement result includes the address of a transmitting active measuring unit, the address of a receiving active measuring unit, and the data of communication quality. Here, the communication quality is a data of communication quality such as the packet loss rate, the burst property of the packet loss, the reception rate, the delay jitter and the like.

Figure 13:
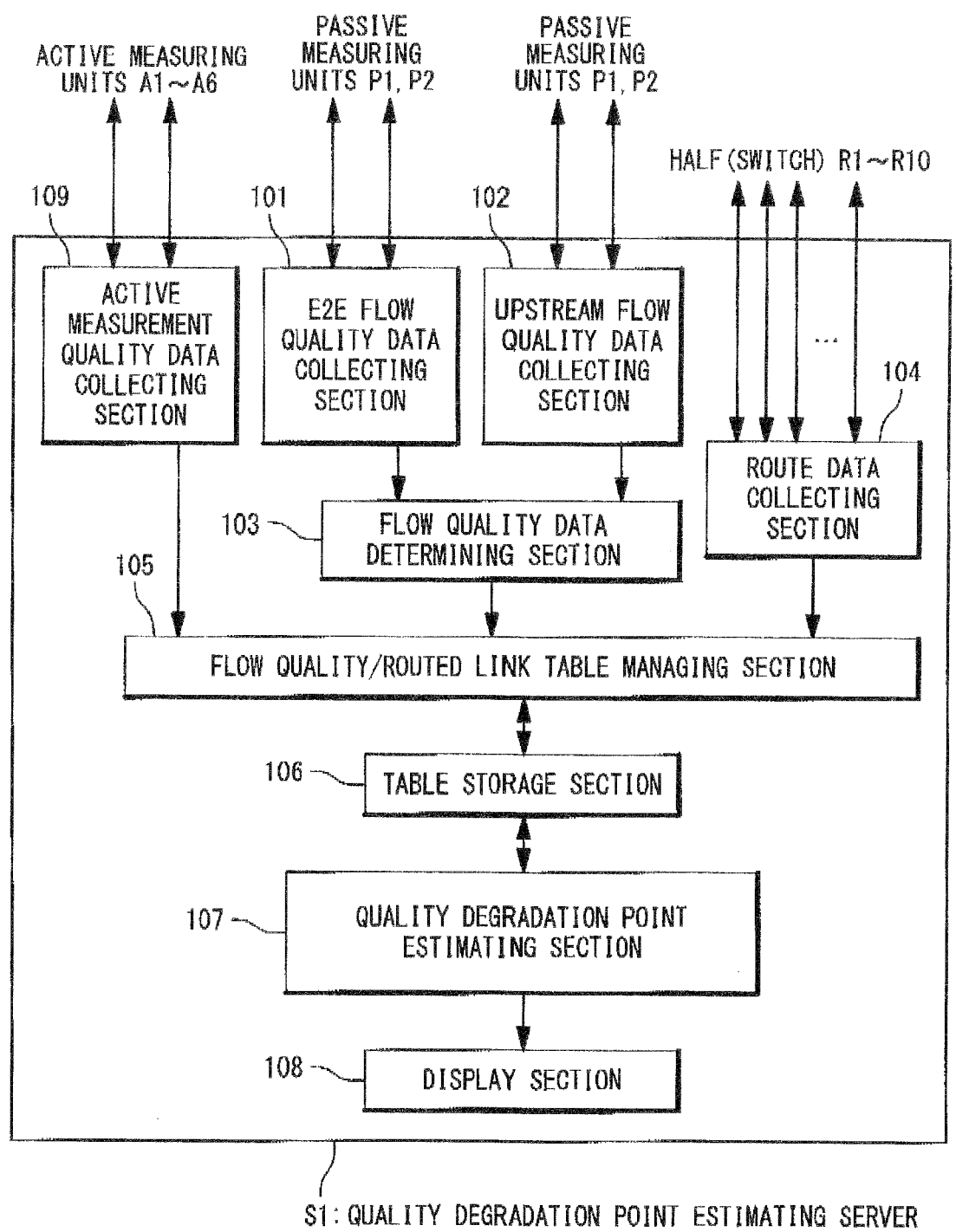
FIG. 13 is a block diagram of a quality degradation portion estimating server in the second exemplary embodiment of the present invention.

With reference to FIG. 13, the quality degradation portion estimating server S1 in this exemplary embodiment differs from the quality degradation portion estimating server S1 in the first exemplary embodiment shown in FIG. 2 in that an active measurement quality data collecting section 109 is newly added and the function of the flow quality/routed link table managing section 105 is enhanced. The E2E flow quality data collecting section 101, the upstream flaw quality data collecting section 102, the flow quality data determining section 103, the route data collecting section 104, the table storage section 106, the quality degradation portion estimating section 107 and the display section 108 are similar to the first exemplary embodiment.

The active measurement quality data collecting section 109 instructs the active measuring units A1 to A6 to carry out the active measurements and receives the measurement results, namely, the set of data (the address of the transmitting active measuring unit, the address of the receiving active measuring unit, and the data of communication quality), and then notifies to the flow quality/routed link table managing section 105.

The flow quality/routed link table managing section 105 adds the data of the address of the active measuring unit on the transmitting side, the address of the active measuring unit on the receiving side, a link set through which the flow is routed, and a quality flag indicating communication quality of the flow, to the flow quality/routed link table, in the flow related to the active measurement, based on the active measurement quality data from the active measurement quality data collecting section 109 and the routing data from the route data collecting section 104, in addition to the operation of the flow quality/routed link table managing section 105 in the first exemplary embodiment. The definition of the link and a setting method of the quality flag are similar to the first exemplary embodiment.

The operation of the second exemplary embodiment will be described below.

Now, it is supposed that the flows F1 to F5 shown in FIG. 4 flow on the communication network system shown in FIG. 12, similarly to the first exemplary embodiment.

Figure 14:
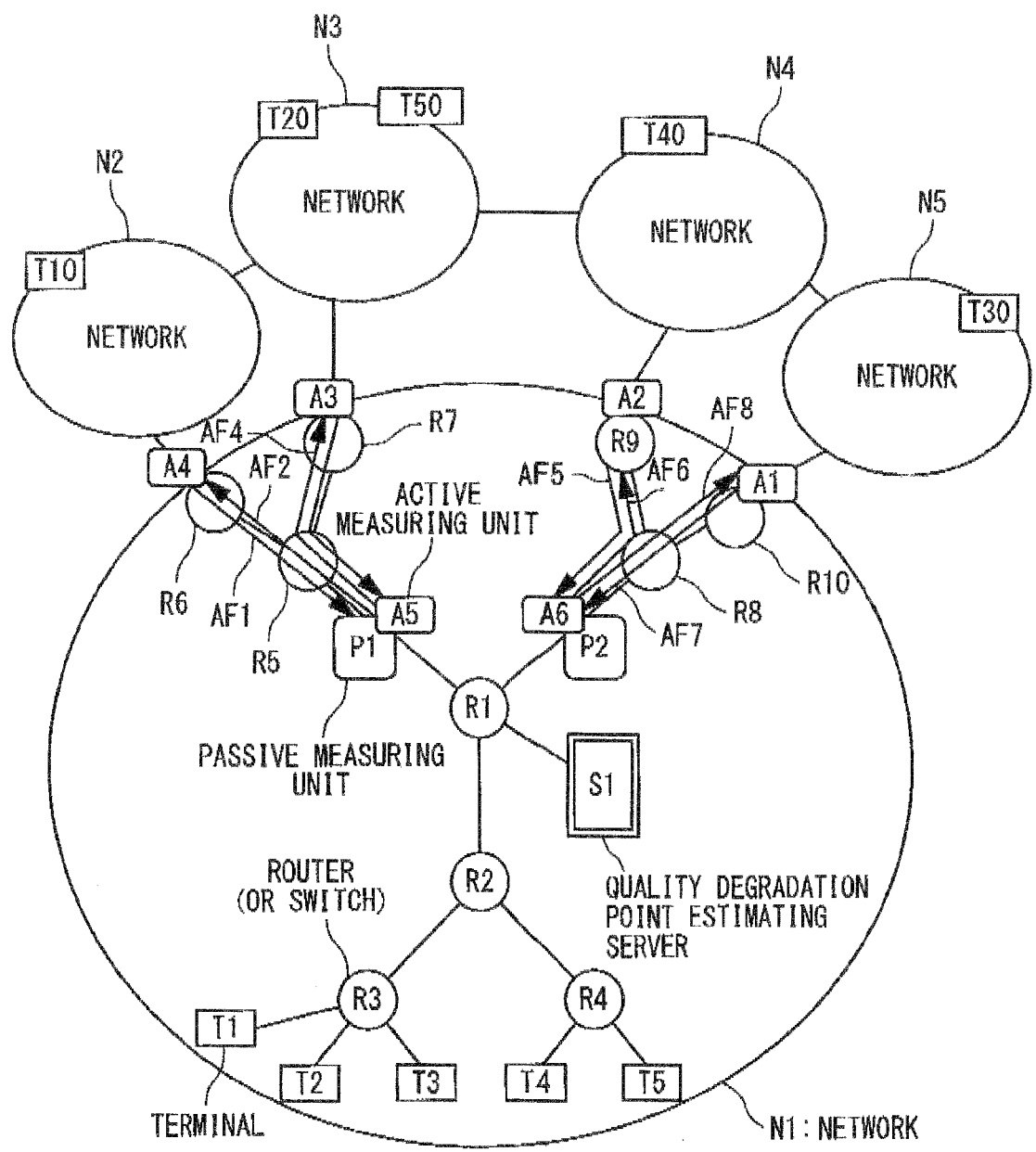
FIG. 14 is a diagram showing active measurement points in the second exemplary embodiment of the present invention.

The active measurement quality data collecting section 109 in the quality degradation portion estimating server S1 instructs the active measurement between the active measuring unit A4 and the active measuring unit A5, between the active measuring unit A3 and the active measuring unit A5, between the active measuring unit A2 and the active measuring unit A6 and between the active measuring unit A1 and the active measuring unit A6, as shown by arrows in FIG. 14. Consequently, the quality data between the passive measuring units P1 and P2 and the boundary points with the different networks are passively measured. FIG. 15 shows one example of the active measurement result at this time.

When receiving the active measurement result shown in FIG. 15, The active measurement quality data collecting section 109 in the quality degradation portion estimating server S1 notifies it to the flow quality/routed link table managing section 105. The flow quality/routed link table managing section 105 determines that a flow AF1 of the first row in FIG. 15 is a flow of bad quality and flows AF2 to AF8 other than it are flows of good quality, when a flow in which the delay variation is 60 ms or less and the packet loss rate is 1% or less is assumed to be the condition of the flow having good communication quality. The flow quality/routed link table managing section 105 adds data of the address of the active measuring unit on the transmitting side, the address of the active measuring unit on the receiving side, the link set through which the flow is routed, and the quality flag indicating the communication quality of the flow, to the flow quality/routed link table. At this time, similarly to the first exemplary embodiment, the E2E flow quality data shown in FIG. 5 and the upstream flow quality data shown in FIG. 6 are measured by the passive measuring units P1 and P2 and sent to the quality degradation portion estimating server S1, and when the flow quality/routed link table shown in FIG. 8 is generated based on them, the flow quality/routed link table to which the active measurement result is added becomes a state shown in FIG. 16. However, the flows AF2, AF4, AF6 and AF8 are omitted in FIG. 16.

The quality degradation portion estimating section 107 reads the flow quality/routed link table shown in FIG. 16 from the table storage section 106 and removes the non-degradation link to generate the flow quality/routed link table shown in FIG. 17, and then estimates a link set {L20, L300} as the quality degradation portion by using the minimum link number estimating method. That is, in this case, the quality degradation in the link L300 that is missed in the first exemplary embodiment is detected.

According to this exemplary embodiment, it is possible to estimate the quality degradation portion on the route between the boundary point and the packet measurement point, together with the effect similar to the first exemplary embodiment. That is, the estimation of the quality degradation portion requires both of the data of the presence or absence of the quality degradation in the flow and the route through which it passes. However, only from the arrangement of the passive measuring units P1 and P2, there is a case that the presence or absence of the quality degradation on the route from the network boundary point to the packet measurement point is not known or there is a case that the route itself is not known. Also, there is a case that the presence or absence of the quality degradation on the route from the packet measurement point to the network boundary point is not also known. In this exemplary embodiment, it is possible to carry out active measurement between the passive measurement point and the network boundary point and consequently clarify the presence or absence of the quality degradation between the passive measurement point and the network boundary point, and also use the fact that the route of the flow of the active measurement is clear and consequently estimate the quality degradation portion on the route between the network boundary point and the passive measurement point. By using the quality measurement result based on the passive measurement point, as compared with a case of carrying out the active measurement only between the passive measurement point and the network boundary point, the improvement of the estimation precision of the same route and the estimation of the quality degradation portion in a route other than the same route are attained at the same time.

Modification of Second Exemplary Embodiment

The description in the modification of the first exemplary embodiment can be similarly applied to a modification of the second exemplary embodiment.

As mentioned above, the exemplary embodiments of the present invention have been described. However, the present invention is not limited to the above-mentioned exemplary embodiments, and the other various modifications and changes are possible. Also, the function of the quality degradation portion estimating server S1 can be naturally attained in hardware. Moreover, this may be attained by a computer and a program. The program is recorded on a computer-readable recording medium such as a magnetic disc and a semiconductor memory, and this is read by the computer when the computer is started. Thus, since the operation of the computer is controlled, the computer functions as the quality degradation portion estimating server S1 in the above-mentioned respective exemplary embodiments.

According to the present invention, the generation of the degradation of communication quality in the management target network can be detected by using the E2E flow quality data when the transmitting terminal exists in a different network, among the E2E flow quality data between the transmitting and receiving terminals that are measured by the passive measuring method, hereby estimating the quality degradation portion. As its reason, the upstream flow quality data of the zone between the transmitting terminal and the passive measuring unit is measured, simultaneously with the measurement of the E2E flow quality data on the route between the transmitting terminal and the receiving terminal, and the flow related to the E2E flow quality data that does not show the degradation of flow quality, for the upstream flow quality data related to the same transmitting and receiving terminals among the E2E flow quality data showing the degradation of flow quality is detected as the quality degradation flow in the management target network.

For this reason, even in the severe situation in which the flow flowing through the management target network is only the flow from the transmitting terminal existing in a different network to the receiving terminal existing in the management target network, the degradation of communication quality in the management target network can be detected based on the quality data when the passive measurement is carried out to the flow, thereby estimating the quality degradation portion.

By executing a software product by a computer, there are realized a collecting section configured to collect E2E flow quality data on a route between a transmitting terminal connected to a different network and a receiving terminal connected to a management target network, and upstream flow quality data on the route between the transmitting terminal and the passive measuring unit, which are measured by a passive measuring unit connected to the management target network, and a degradation flow detecting unit configured to detect a flow related to the E2E flow quality data that does not show a degradation of flow quality, for the upstream flow quality data related to the same transmitting and receiving terminals as a quality degradation flow in the management target network, from among the E2E flow quality data that show the degradation of flow quality, based on the collected E2E flow quality data and upstream flow quality data.

By executing a software product by a computer, there are realized a collecting section configured to collect E2E flow quality data on a route between a transmitting terminal connected to a different network and a receiving terminal connected to a management target network, and upstream flow quality data on the route between the transmitting terminal and a passive measuring unit, which are measured by the passive measuring unit connected to the management target network, and a flow quality data between a boundary point with the different network and the passive measurement point arranged with the passive measuring unit, which are measured by active measuring units arranged at the passive measurement point and the boundary point, and a degradation flow detecting unit configured to detect a flow related to the E2E flow quality data that does not show degradation of flow quality, for the upstream flow quality data related to the same transmitting and receiving terminals from among the E2E flow quality data that show the degradation of flow quality and a flow that show the degradation of flow quality, of the flow quality data on the route between the boundary point and the passive measurement point, as a quality degradation flow in the management target network, based on the collected E2E flow quality data and upstream flow quality data.

By executing a software product by a computer, there is realized an estimating section configured to estimate a quality degradation portion in the management target network, based on the quality degradation flow in the management target network and a route data of the management target network.

By executing the software product by the computer, the estimating section estimates, as the quality degradation portion, a network component included in a combination in which the number of components is minimum, among all the combinations of the network components that may generate the quality degradation in the quality degradation flow in the management target network.

By executing the software product by the computer, the estimating section refers to quality degradation probabilities of the network components and estimates as the quality degradation portion, the network component included in a combination in which the generation probability of the quality degradation is the highest, among all the combinations of the network components that may generate the quality degradation in the quality degradation flow in the management target network.

The invention claimed is:

1. A quality degradation portion estimating method on a network, comprising:
passively measuring, by a passive measuring unit connected with a management target network, end-to-end (E2E) flow quality data on a route from a transmitting terminal connected with a different network to a receiving terminal connected with the management target network and upstream flow quality data on the route from the transmitting terminal to said passive measuring unit in the management target network;
collecting the E2E flow quality data and the upstream flow quality data which are measured by said passive measuring unit;
detecting a quality degradation flow in the management target network, said detected quality degradation flow being a flow related to the E2E flow quality data that does not show degradation of flow quality for the upstream flow quality data related to the same transmitting and receiving terminals, from among the E2E flow quality data which show the degradation of flow quality; and
estimating a quality degradation portion in the management target network based on the quality degradation flow in the management target network and route data of the management target network, wherein said estimating comprises:
referring to network component quality degradation probabilities to estimate as a quality degradation portion, a network component contained in a combination that quality degradation probability is the highest, from among combinations of faults of the network components which cause the quality degradation in the quality degradation flow in the management target network.

2. The quality degradation portion estimating method according to claim 1, wherein said estimating comprises:
estimating as a quality degradation portion, a network component contained in a combination that the number of the components is the smallest, from among combinations of faults of the network components which cause the quality degradation in the quality degradation flow in the management target network.

3. The quality degradation portion estimating method according to claim 1, wherein said measuring comprises:
the passive measuring unit measuring the E2E flow quality data by collecting feedback packets from the receiving terminal.

4. The quality degradation portion estimating method according to claim 3, wherein said measuring comprises:
collecting RTCP-RR packets as the feedback packets.

5. A quality degradation portion estimating method on a network, comprising:
measuring by a passive measuring unit connected with a management target network, end-to-end (E2E) flow quality data on a route from a transmitting terminal connected with a different network to a receiving terminal connected with the management target network and upstream flow quality data on the route from the transmitting terminal to said passive measuring unit in the management target network;
measuring by active measuring units arranged in a boundary point with the different network in the management target network and a passive measurement point of the passive measuring unit, a flow quality data on the route from the boundary point to the passive measurement point;
collecting the E2E flow quality data and the upstream flow quality data which are measured by the passive measuring unit, and the flow quality data which are measured by the active measuring unit;
detecting a quality degradation flow in the management target network, said detected quality degradation flow being a flow related to the E2E flow quality data which does not show the degradation of flow quality for by the upstream flow quality data related to the same transmitting and receiving terminals, from among the E2E flow quality data which shows the degradation of flow quality, and a flow that shows the degradation of flow quality from among the flow quality data on the route from the boundary point to the passive measurement point; and
estimating a quality degradation portion in the management target network based on the quality degradation flow in the management target network and route data of the management target network, wherein said estimating comprises:
referring to network component quality degradation probabilities to estimate as a quality degradation portion, a network component contained in a combination that quality degradation probability is the highest, from among combinations of faults of the network components which cause the quality degradation in the quality degradation flow in the management target network.

6. A communication network system comprising:
a passive measuring unit connected with a management target network and configured to passively measure end-to-end (E2E) flow quality data on a route from a transmitting terminal connected with a different network to a receiving terminal connected with the management target network and upstream flow quality data on the route from the transmitting terminal to said passive measuring unit in the management target network; and
a quality degradation portion estimating unit connected with the management target network and configured to collect the E2E flow quality data and the upstream flow quality data which are measured by said passive measuring unit, and detect as a quality degradation flow in the management target network, a flow related to the E2E flow quality data that does not show degradation of flow quality, for the upstream flow quality data related to the same transmitting and receiving terminals, from among the E2E flow quality data which show the degradation of flow quality,
wherein the quality degradation portion estimating unit comprises an estimating section configured to estimate a quality degradation portion in the management target network based on the quality degradation flow in the management target network and route data of the management target network,
   wherein said estimating section refers to network component quality degradation probabilities to estimate as a quality degradation portion, a network component contained in a combination that quality degradation probability is the highest, from among combinations of faults of the network components which cause the quality degradation in the quality degradation flow in the management target network.

7. The communication network system according to claim 6, wherein said estimating section estimates as a quality degradation portion, a network component contained in a combination that the number of the components is the smallest, from among combinations of faults of the network components which cause the quality degradation in the quality degradation flow in the management target network.

8. The communication network system according to claim 6, wherein the packet measuring unit measures the E2E flow quality data by collecting feedback packets from the receiving terminal.

9. The communication network system according to claim 8, wherein the packet measuring unit collects RTCP-RR packets as the feedback packets.

10. A communication network system comprising:
   a passive measuring unit connected with a management target network and configured to passively measure end-to-end (E2E) flow quality data on a route from a transmitting terminal connected with a different network to a receiving terminal connected with the management target network and upstream flow quality data on the route from the transmitting terminal to said passive measuring unit in the management target network;
   active measuring units arranged in a boundary point with the different network in the management target network and a passive measurement point of the passive measuring unit and configured to measure a flow quality data on the route from the boundary point to the passive measurement point; and
   a quality degradation portion estimating unit connected with the management target network and configured to collect the E2E flow quality data and the upstream flow quality data which are measured by the passive measuring unit, and the flow quality data which are measured by the active measuring unit, and detect as a quality degradation flow in the management target network, a flow related to the E2E flow quality data which does not show the degradation of flow quality, for by the upstream flow quality data related to the same transmitting and receiving terminals, from among the E2E flow quality data which shows the degradation of flow quality, and a flow that shows the degradation of flow quality from among the flow quality data on the route from the boundary point to the passive measurement point,
   wherein the quality degradation portion estimating unit comprises an estimating section configured to estimate a quality degradation portion in the management target network based on the quality degradation flow in the management target network and route data of the management target network,
   wherein said estimating section refers to network component quality degradation probabilities to estimate as a quality degradation portion, a network component contained in a combination that quality degradation probability is the highest, from among combinations of faults of the network components which cause the quality degradation in the quality degradation flow in the management target network.

11. A quality degradation portion estimating apparatus comprising:
   a collecting section configured to collect end-to-end (E2E) flow quality data on a route from a transmitting terminal connected with a different network to a receiving terminal connected with a management target network and upstream flow quality data on the route from the transmitting terminal to a passive measuring unit in the management target network, which are passively measured by the passive measuring unit connected with the management target network; and
   a degradation flow detecting section configured to detect as a quality degradation flow in the management target network, a flow related to the E2E flow quality data that does not show degradation of flow quality, for the upstream flow quality data related to the same transmitting and receiving terminals, from among the E2E flow quality data which show the degradation of flow quality,
   an estimating section configured to estimate a quality degradation portion in the management target network, based on the quality degradation flow in the management target network and a route data of the management target network,
   wherein the estimating section refers to quality degradation probabilities of the network components and estimates as the quality degradation portion, the network component included in a combination in which the generation probability of the quality degradation is the highest, among all the combinations of the network components that may generate the quality degradation in the quality degradation flow in the management target network.

12. The quality degradation portion estimating apparatus according to claim 11, wherein the estimating section estimates, as the quality degradation portion, a network component included in a combination in which the number of components is minimum, among all the combinations of the network components that may generate the quality degradation in the quality degradation flow in the management target network.

13. A quality degradation portion estimating apparatus comprising:
   a collecting section configured to collect end-to-end (E2E) flow quality data on a route from a transmitting terminal connected with a different network to a receiving terminal connected with a management target network and upstream flow quality data on the route from the transmitting terminal to a passive measuring unit in the management target network, which are passively measured by the passive measuring unit connected with the management target network, a flow quality data on the route from a boundary point with a different network in the management target network to the passive measurement point, which is measured by the active measuring units arranged at the boundary point and the different network and the passive measurement point;
   a degradation flow detecting section configured to detect as a quality degradation flow in the management target network, a flow related to the E2E flow quality data that does not show degradation of flow quality, for the upstream flow quality data related to the same transmitting and receiving terminals, from among the E2E flow quality data which show the degradation of flow quality, and a flow that shows the degradation of flow quality from among the flow quality data on the route from the boundary point to the passive measurement point; and an estimating section configured to estimate a quality degradation portion in the management target network, based on the quality degradation flow in the management target network and a route data of the management target network, wherein the estimating section refers to quality degradation probabilities of the network components and estimates as the quality degradation portion, the network component included in a combination in which the generation probability of the quality degradation is the highest, among all the combinations of the network components that may generate the quality degradation in the quality degradation flow in the management target network.

14. A non-transitory computer-readable recording medium recording thereon a computer program when executed by a processor performs a quality degradation portion estimating method, wherein said method comprises:

collecting end-to-end (E2E) flow quality data on a route from a transmitting terminal connected with a different network to a receiving terminal connected with a management target network and upstream flow quality data on the route from the transmitting terminal to a passive measuring unit in the management target network, wherein the E2E flow quality data are passively measured by the passive measuring unit connected with the management target network;

detecting a quality degradation flow in the management target network, said detected quality degradation flow being a flow related to the E2E flow quality data that does not show degradation of flow quality for the upstream flow quality data related to the same transmitting and receiving terminals, from among the E2E flow quality data which show the degradation of flow quality;

estimating a quality degradation portion in the management target network, based on the quality degradation flow in the management target network and a route data of the management target network; and referring to quality degradation probabilities of the network components to estimate as the quality degradation portion, the network components included in a combination in which the generation probability of the quality degradation is the highest, among all the combinations of the network components that may generate the quality degradation in the quality degradation flow in the management target network.

15. The non-transitory computer-readable recording medium according to claim 14, wherein said collecting comprises:

collecting the E2E flow quality data, the upstream flow quality data a flow quality data on the route from a boundary point with the different network in the management target network to the passive measurement point, wherein the flow quality data is measured by the active measuring units arranged at the boundary point and the passive measurement point;

said detecting comprises:

detecting the quality degradation flow in the management target network, said detected quality degradation flow being the flow related to the E2E flow quality data, and a flow that shows the degradation of flow quality from among the flow quality data on the route from the boundary point to the passive measurement point;

estimating a quality degradation portion in the management target network, based on the quality degradation flow in the management target network and a route data of the management target network; and referring to quality degradation probabilities of the network components to estimate as the quality degradation portion, the network components included in a combination in which the generation probability of the quality degradation is the highest, among all the combinations of the network components that may generate the quality degradation in the quality degradation flow in the management target network.

16. The non-transitory computer-readable recording medium according to claim 14, further comprising:

estimating as the quality degradation portion, a network component included in a combination in which the number of components is minimum, among all the combinations of the network components that may generate the quality degradation in the quality degradation flow in the management target network.

\* \* \* \* \*